United States Patent [19]
Valint, Jr. et al.

[11] Patent Number: 5,177,165
[45] Date of Patent: Jan. 5, 1993

[54] SURFACE-ACTIVE MACROMONOMERS

[75] Inventors: Paul L. Valint, Jr., Pittsford; Joseph A. McGee, Dewitt, both of N.Y.

[73] Assignee: Bausch & Lomb Incorporated, Rochester, N.Y.

[21] Appl. No.: 806,936

[22] Filed: Dec. 11, 1991

Related U.S. Application Data

[63] Continuation of Ser. No. 618,450, Nov. 27, 1990, abandoned.

[51] Int. Cl.$^5$ .................. C08F 230/08; C08F 226/10; C08F 220/24
[52] U.S. Cl. .................... 526/245; 526/279; 526/264; 526/304; 526/320; 526/248; 526/242; 526/301; 526/293; 526/314; 526/312; 526/224
[58] Field of Search ............... 526/279, 245, 320, 304, 526/224, 264

[56] References Cited

U.S. PATENT DOCUMENTS

| | | | |
|---|---|---|---|
| 3,337,516 | 8/1967 | Stuart et al. | 526/320 X |
| 3,541,138 | 11/1970 | Emmous | 260/485 |
| 3,810,874 | 5/1974 | Mitsch | 260/75 |
| 4,075,411 | 2/1978 | Dickstein | 560/224 |
| 4,136,250 | 1/1979 | Mueller | 528/29 |
| 4,153,641 | 5/1979 | Deichert | 260/827 |
| 4,189,546 | 2/1980 | Deichert | 528/26 |
| 4,230,844 | 10/1980 | Chang | 526/210 |
| 4,424,328 | 1/1984 | Ellis | 526/279 |
| 4,463,149 | 7/1984 | Ellis | 526/279 |
| 4,534,916 | 8/1985 | Wichterle | 264/2.1 |
| 4,546,123 | 10/1985 | Schafer | 523/106 |
| 4,569,965 | 2/1986 | Engel | 524/544 |
| 4,686,267 | 8/1987 | Ellis | 526/245 |
| 4,711,943 | 12/1987 | Harvey | 526/279 |
| 4,740,533 | 4/1988 | Su | 523/106 |
| 4,789,713 | 12/1988 | Sanner | 526/81 |
| 4,797,458 | 1/1989 | Sharaby | 526/194 |
| 4,806,609 | 2/1989 | Tracy et al. | 526/264 |
| 4,810,764 | 3/1989 | Friends | 526/245 |
| 4,814,514 | 3/1989 | Yokota et al. | 568/608 |
| 4,921,902 | 5/1990 | Evani et al. | 524/555 |
| 5,034,461 | 7/1991 | Lai et al. | 525/100 |
| 5,070,215 | 12/1991 | Baumbury et al. | 556/418 |
| 5,075,400 | 12/1991 | Andrade et al. | 526/307.5 |

FOREIGN PATENT DOCUMENTS

| | | |
|---|---|---|
| 153133 | 8/1985 | European Pat. Off. |
| 59-94731 | 5/1984 | Japan |
| 61-209275 | 9/1986 | Japan |

OTHER PUBLICATIONS

Hanley's Condensed Chemical Dictionary, 11th Ed., Van Nostrand Reinhold, New York, 1987, p. 619, 751 (N. I. Sax and R. J. Lewis, Sr., eds.).
D. Myers, "Surfaces Interfaces, and Colloids", VCH Publishers New York, pp. 32-33 (1991).
Interactions of PEO-Containing Polymeric Surfactants With Hydrophobic Surfaces, J. H. Lee, Univ. of Utah (1988).
"Graft Copolymers Having Hydrophobic Backbone and Hydrophilic Braches. IV. A Copolymerization Study of Water-Soluble Oligonvinyl Pyrrolidone Macromonomers," J. Polymer Sci.: Part A: Polymer Chemistry, vol. 27, pp. 3521–3530, M. Akashi, et al. (1989).
"Copolymers of Acrylamide and Surfactant Macromonomers: Synthesis and Solution Properties," Polymer, vol. 28, pp. 2110–2115 (Nov., 1987), Schulz, et al.
"Hydrophilic Spacer Groups in Polymerizable Lipids: Formation of Bimembrane Models From Bulk Polymerized Lipids," J. Am. Chem. Soc., vol. 107, pp. 4134–4141 (1985), H. Ringdorf, et al.
"Saturated and Polymerizable Amphiphiles With Fluorocarbon Chains. Investigation in Monolayers and Liposomes," J. Am. Chem. Soc., vol. 106, pp. 7687–7692 (1984), H. Ringdorf, et al.
"Graft Polymers With Macromonomers. I. Synthesis From Methacrylate-Terminated Polystrene," J. App. Polym. Sci., 27, 4773 (1982), G. O. Schultz and R. Milkovich.
"Graft Polymers With Macromonomer. II. Copolymerization Kinetics of Methacrylate-Terminated Polystyrene and Predicted Graft Copolymer Structures," J. Polym. Sci. Polym. Chem. Ed., 22, 1633 (1984), G. O. Schutz and R. Milkovich.
"Synthesis and Application of Fluorine Containing Graft Copolymers," Polymer Bull., 5, 335–340 (1981), Y. Yamashita.
"Synthesis and Characterization of Functional Graft Copolymers by Macromonomer Technique," J. Appl. Polym. Sci., 36, 193–199 (1981), Y. Yamashita.
"Synthesis of N-Hydroxyethyl-N-Methylmetahcrylamide and Its Use in the Macromonomer Synthesis," J. Polym. Sci., Polym. Letters Ed., 19, 629–636 (1981) Y. Kawakami et al.

(List continued on next page.)

Primary Examiner—Joseph L. Schofer
Assistant Examiner—M. Nagumo
Attorney, Agent, or Firm—Denis A. Polyn; Craig E. Larson

[57] ABSTRACT

A new class of polymerizable surfactants, useful for modifying the surfaces of polymeric objects, which are described by the formula:

$$DC[A_xB_y]$$

wherein A is at least one ethylenically unsaturated hydrophilic monomer, B is at least one ethylenically unsaturated hydrophobic monomer, C is a functional chain transfer agent, D is an ethylenically unsaturated end group, y is within the range from about 0.1 to about 0.9, and x+y=1. Also disclosed are random copolymer precursors of such polymerizable surfactants.

14 Claims, No Drawings

OTHER PUBLICATIONS

U.S. Ser. No. 07/363,662 filed Jun. 7, 1989, entitled "Novel Prepolymers Useful in Biomedical Devices".

U.S. Ser. No. 07/364,204 filed May 2, 1989, entitled "Novel Vinyl Carbonate and Vinyl Carbamate Contact Lens Material Monomers".

"Monomeric Surfactants for Surface Modification of Polymers," *Macromolecules*, vol. 23, pp. 126–132 (1990), B. Ranby, et al.

"Polymerized Monolayers From a Styrene Functionalized Surfactant," *Colloids and Surfaces*, vol. 35, pp. 343–351 (1989), J. H. Fendler.

Die Makromolekulare Chemie, vol. 186, issued 1985, Basel, Heidelberg, New York, Ch. Bonardi et al. "Synthese et copolymerization avec l'acrylamide de macronomeres d'acrylate de dodecyl", see pp. 261–271.

Die Angewandte Makromole-Kulare Chemie, vol. 132, issued 1985, Basel, Heidelberg, New York, M. Akashi et al. "Synthesis and Polymerization of a Styryl Terminated Oligovinyl-pyrrolidoine Macromonomer", see pp. 81–89.

SURFACE-ACTIVE MACROMONOMERS

This is a continuation of copending application Ser. No. 07/618,450 filed on Nov. 27, 1990, now abandoned.

BACKGROUND OF THE INVENTION

The present invention is directed to materials useful for modifying the surfaces of solid materials and more particularly to polymerizable surfactants.

Surface structure and composition determine many of the physical properties and ultimate uses of solid materials. Characteristics such as wetting, friction, electrostatic charging, and adhesion are largely influenced by surface characteristics. Of particular concern are the effects of such surface characteristics on biocompatibility. The alteration of surface characteristics is therefore of special significance in biotechnical applications. Improved methods are accordingly sought for modifying solid surfaces, particularly the surfaces of polymeric objects.

Random, grafted, polymerized surfactants have been used to modify the surfaces of hydrophobic polymers by the adsorption of the surfactant onto the surfaces of polymeric objects from an aqueous dispersion. Lee, J. H., *Interactions of PEO-Containing Polymeric Surfactants With Hydrophobic Surfaces*, The University of Utah (1988)(hereinafter "Lee"). Lee—particularly concerned with reducing the absorption of blood plasma proteins on hydrophobic surfaces—teaches the synthesis of polymeric surfactants by random free radical copolymerization of a hydrophobic methacrylate (hexyl methacrylate or lauryl methacrylate), a hydrophilic methacrylate (polyethylene oxide methacrylate), and methyl methacrylate.

Akashi, M., et al., "Graft Copolymers Having Hydrophobic Backbone and Hydrophilic Branches. IV. A Copolymerization Study of Water-Soluble Oligovinylpyrrolidone Macromonomers," *J. Polymer Sci.: Part A: Polymer Chemistry*, Vol. 27, pp. 3521-3530 (1989)(hereinafter "Akashi") teaches amphiphiles prepared by random free radical copolymerization of carboxyl group-terminated oligovinylpyrrolidone with methyl methacrylate or styrene. Syntheses of vinylphenyl-terminated and methacryloyl-terminated oligovinylpyrrolidone macromonomers are described.

Polymerizable surfactants have been used to modify the properties of polymers in aqueous solution. For example, Schulz, et al., "Copolymers of Acrylamide and Surfactant Macromonomers: Synthesis and Solution Properties," *Polymer*, Vol. 28, pp. 2110-2115 (Nov., 1987)(hereinafter "Schulz") describes macromonomer surfactants wherein the surfactant character is achieved by the addition of a small hydrophobic functionality (e.g., nonylphenol) to a water-soluble polyethylene oxide chain. Related materials and methods are disclosed in U.S. Pat. No. 4,075,411.

Polymerizable surfactants have also been used to modify the surface properties of solids. One class of materials used for this purpose are lipids (non-polymeric materials) which are rendered polymerizable by the addition of various functionalities such as methacrylate groups [Ringsdorf, H., et al., "Hydrophilic Spacer Groups in Polymerizable Lipids: Formation of Biomembrane Models form Bulk Polymerized Lipids," *J. Am. Chem. Soc.*, Vol. 107, pp. 4134-4141 (1985)] and various vinyl groups [Ringsdorf, H., et al., "Saturated and Polymerizable Amphiphiles with Fluorocarbon Chains. Investigation in Monolayers and Liposomes," *J. Am. Chem. Soc.*, Vol. 106, pp. 7687-7692 (1984)]. These polymerizable lipid surfactants have been used to prepare liposomes used in the formation and stabilization of biomembrane models (often referred to as polymeric liposomes).

Polyfunctional polymerizable surfactants have also been used in coatings to modify the surface properties of polymeric objects. European Patent Publication No. 153,133 (hereinafter "Regen"). Preferred polymerizable surfactants taught by Regen are polyfunctional lipids. Regen teaches that monofunctional polymerizable surfactants are ineffective for modifying surfaces of polymeric objects. Other polyfunctional polymerizable surfactants are disclosed in U.S. Pat. No. 3,541,138.

An object of Regen was to overcome the limitations of Langmuir-Blodgett processes, especially when applied to more complex surface topographies. Polymerizable surfactants have of course been employed in Langmuir-Blodgett films. These multilayer surfactant assemblies are exploited in microlithography and other opto-electronic systems. Fendler, J. H., "Polymerized Monolayers from a Styrene Functionalized Surfactant," *Colloids and Surfaces*, Vol. 35, pp. 343-351 (1989).

Contact lenses are conventionally produced by one of three general techniques—lathing, static casting, and spin casting. Combinations are also known. For example, semi-finished buttons (having one final lens surface) may be formed by static or spin casting and the second lens surface may be produced by lathing. Static and spin casting have the advantage of producing lenses with fewer processing steps than lathing. In either of the molding techniques, the anterior and posterior surfaces of the lens may be formed in one step. Static casting does this by providing two mold surfaces; spin casting does this by providing a mold surface to form the anterior surface and by using the forces generated by spinning liquid monomer to form the posterior surface.

One of the challenges faced when producing lenses by molding is achieving release of the lenses from the molds without damaging the lens surfaces. The phenomenon of lens adherence is a consequence of chemical interactions between mold surfaces and monomer mixtures during polymerization. Among the proposals to meet this challenge is U.S. Pat. No. 4,534,916, which teaches adding (nonpolymerizable) surfactants to the monomer mix. The surfactant addition is reported to improve the surface quality of lenses by decreasing the number of surface defects resulting from mold release (especially of xerogel lenses).

The '916 patent seeks improved surface quality by reducing lens damage during demolding. Others have sought to improve surface quality more directly—by surface modifications. For example, U.S. Pat. No. 4,546,123 teaches covalent attachment of (nonpolymerizable) surfactant molecules to a hydrogel lens surface.

The macromonomer technique for preparing graft copolymers of controlled architecture is well known. Macromonomers or macromers are polymers of molecular weight ranging from the hundreds to tens of thousands, with one of the end groups functionalized to enter into further polymerization. Milkovich, Chiang and Schultz demonstrated the synthesis and applications of a variety of macromers. R. Milkovich, M. T. Chiang, U.S. Pat. No. 3,842,050 (1974); Schultz, G. O. and Milkovich, R., *J. App. Polym. Sci.*, 27, 4773 (1982); Schultz, G. O. & Milkovich, R., *J. Polym. Sci. Polym. Chem. Ed.*, 22, 1633 (1984).

Yamashita, Y.; "Synthesis and Application of Fluorine Containing Graftcopolymers," *Polymer Bull.*, 5, 335-340 (1981); "Synthesis and Characterization of Functional Graft Copolymers by Macromonomer Technique", *J. Appl. Polym. Sci.*, 36, 193-199 (1981); "Synthesis of N-Hydroxyethyl-N-Methylmethacrylamide and Its Use in the Macromonomer Synthesis", *J. Polym. Sci., Polym. Letters Ed.*, 19, 629-636 (1981); (hereinafter "Yamashita") teaches a method of making macromers and the use of macromers to make graft copolymers. Yamashita used free radical polymerization in the presence of an effective chain transfer agent which controlled the molecular weight of the final macromer and also provided a functional end group. Thioglycolic acid, for example, is an effective chain transfer agent which provides a carboxylic acid functional end group. The end group can subsequently be reacted with, e.g., glycidyl methacrylate to give a terminal methacrylate polymerizable group. Yamashita used macromers of MMA to prepare graft copolymers of fluoroalkyl acrylates with polyMMA grafts. Yamashita does not teach the synthesis of polymerizable surfactants by the macromonomer technique.

SUMMARY OF THE INVENTION

A new class of polymerizable surfactants has now been found that modify the surface properties of a polymeric object. The polymerizable surfactants are novel surface active macromonomers described by the formula:

$$DC[A_xB_y]$$

wherein A is at least one ethylenically unsaturated hydrophilic monomer, B is at least one ethylenically unsaturated hydrophobic monomer, C is a functional chain transfer agent, D is an ethylenically unsaturated end group, y is within the range from about 0.1 to about 0.9, and $x+y=1$. In a preferred embodiment, the polymeric object is a contact lens.

A further aspect of this invention is a novel class of random copolymers prepared by copolymerizing at least one ethylenically unsaturated hydrophobic monomer and at least one ethylenically unsaturated hydrophilic monomer in the presence of a functional chain transfer agent. Preferred copolymers may be described by the formula:

$$C[A_xB_y]$$

wherein A is at least one ethylenically unsaturated hydrophilic monomer, B is at least one ethylenically unsaturated hydrophobic monomer, C is a functional chain transfer agent, y is within the range of about 0.1 to about 0.9, and $x+y=1$. These random copolymers may be used to prepare the novel surface active macromonomers of this invention by adding an ethylenically unsaturated end group to the novel random copolymers.

DETAILED DESCRIPTION OF THE INVENTION

Notations such as "(meth)acrylate" or "(meth)acrylamide" are methyl substitution. Thus, methyl used herein to denote optional (meth)acrylate includes both methyl acrylate and methyl methacrylate and N-alkyl (meth)acrylamide includes both N-alkyl acrylamide and N-alkyl methacrylamide.

The novel random copolymers of this invention can be prepared by copolymerizing at least one ethylenically unsaturated hydrophobic monomer and at least one ethylenically unsaturated hydrophilic monomer in the presence of a functional chain transfer agent. Preferred copolymers may be described by the formula:

$$C[A_xB_y]$$

wherein A is at least one ethylenically unsaturated hydrophilic monomer, B is at least one ethylenically unsaturated hydrophobic monomer, C is a functional chain transfer agent, y is within the range of about 0.1 to about 0.9, and $x+y=1$.

Suitable ethylenically unsaturated hydrophilic monomers ("A" in the above formula) include ethylenically unsaturated polyoxyalkylenes, polyacrylamides, polyvinylpyrrolidones, polyvinyl alcohols, poly (hydroxyethyl methacrylate) or poly (HEMA), and N-alkyl-N-vinyl acetamides. Ethylenic unsaturation may be provided by (meth)acrylate, (meth)acrylamide, styrenyl, alkenyl, vinyl carbonate and vinyl carbamate groups. Preferred hydrophilic macromonomers include methoxypolyoxyethylene methacrylates of molecular weights from 200 to 10,000, more preferred are methoxypolyoxyethylene methacrylates of molecular weight range of 200 to 5,000 and most preferred are methoxypolyoxyethylene methacrylates of molecular weight range of 400 to 5,000. Additional preferred hydrophilic macromonomers include poly-N-vinylpyrrolidone methacrylates of molecular weights of 500 to 10,000. More preferred are poly-N-vinylpyrrolidone methacrylates of molecular weights of 500 to 5,000 and most preferred are poly-N-vinylpyrrolidone methacrylates of molecular weights of 1000 to 5,000. Other preferred hydrophilic macromonomers include poly-N,N-dimethyl acrylamide methacrylates of molecular weights of 500 to 10,000. More preferred are poly-N,N-dimethyl acrylamide methacrylates of molecular weights of 500 to 5,000 and most preferred are poly-N,N-dimethyl acrylamide methacrylates of molecular weights of 1000 to 5,000.

Suitable ethylenically unsaturated hydrophobic monomers ("B" in the above formula) include alkyl (meth)acrylates, N-alkyl (meth)acrylamides, alkyl vinylcarbonates, alkyl vinylcarbamates, fluoroalkyl (meth)acrylates, N-fluoroalkyl (meth)acrylamides, N-fluoroalkyl vinylcarbonates, N-fluoroalkyl vinylcarbamates, silicone-containing (meth)acrylates, (meth)acrylamides, vinyl carbonates, vinyl carbamates, styrenic monomers [selected from the group consisting of styrene, alpha-methyl styrene, para-methyl styrene, para-t-butyl monochloro styrene, and para-t-butyl dichloro styrene] and polyoxypropylene (meth)acrylates. Preferred hydrophobic monomers include methyl methacrylate, dodecyl methacrylate, octafluoropentyl methacrylate, perfluorooctyl methacrylate, methacryoyl oxypropyl tris(trimethylsiloxy)silane (TRIS).

The functional chain transfer agent ("C" in the above formula) controls the molecular weight of the copolymer and provides appropriate functionality for subsequent addition of a polymerizable group. Suitable functional chain transfer agents include mercapto carboxylic acids, mercapto alcohols (also known as hydroxymercaptans), and aminomercaptans. Preferred chain transfer agents include thioglycolic acid, 2-mercaptoethanol and 2-aminoethane thiol. The molar ratio of chain transfer agent to total monomer content used in the copolymerization is preferably in the range of 0.01 to 3, more preferably in the range of 0.02 to 2, and still more preferably in the range of 0.05 to 1.

The novel surface active macromonomers of this invention are described by the formula:

$$DC[A_xB_y]$$

wherein A, B, C, x and y are as described above and D is an ethylenically unsaturated end group.

Selection of the ethylenically unsaturated end group ("D" in the above formula) is determined by the functional group of the functional chain transfer agent. For example, if the chain transfer agent contains a carboxylic acid group, glycidyl methacrylate can provide a methacrylate end group. If the chain transfer agent contains hydroxy or amino functionality, isocyanato ethyl methacrylate or (meth)acryloyl chloride can provide a methacrylate end group and vinyl chloro formate can provide a vinyl end group. A wide variety of suitable combinations of ethylenically unsaturated end groups and functional chain transfer agents will be apparent to those skilled in the art. The foregoing is intended to be illustrative, not limiting.

Varying the ratio of hydrophilic monomer to hydrophobic monomer changes the surface properties of polymeric objects made from the surface active macromers. For example, when preparing contact lenses containing certain surface active macromers of this invention, it has been found that higher amounts of hydrophilic component optimized mold release characteristics of the lenses but that optimum clinical performance was obtained with a relatively lower amount of hydrophilic component. Accordingly, the selection of a particular ratio will be governed by the particular surface properties ultimately sought for the polymeric object. Generally, however, y is preferably in the range from about 0.1 to about 0.9, more preferably in the range from about 0.3 to about 0.9, and still more preferably in the range from about 0.5 to about 0.8.

The random copolymers of this invention are formed by a free radical mechanism using a wide variety of known free radical catalysts such as the diacyl peroxides (e.g., benzoyl peroxide); dialkyl peroxides (e.g., di-tert-butyl peroxides); ketone peroxides (e.g., methylethyl ketone peroxide); and peresters which readily hydrolyze (e.g., tert-butyl peracetate, tert-butyl perbenzoate, di-tert-butyl diperphthalate). A particularly useful class of peroxy initiators are the organic hydroperoxides such as cumene hydroperoxide, methylethyl ketone hydroperoxide, tert-butyl hydroperoxide, etc. The initiators should be used at a concentration of about 0.01 to about 10% by weight of the total formulation, preferably about 0.1 to about 5%. Another class of initiators comprises carbonyl-containing ultraviolet-activated free radical generators, such as acetophenone, benzophenone, and benzoin ethers. Other suitable UV initiators and initiator mixtures will be apparent to one of ordinary skill in the art.

Solvents can be used in the process. Solvent choice will depend upon the solubility parameters of the comonomers used and should be chosen to allow full solubilization of all polymerizate components. Preferred solvents include tetrahydrofuran, dioxane, chloroform, dichloromethane, methanol and mixtures of these solvents.

The surface-active macromers of this invention may be used to modify the surfaces of polymeric objects in two ways. In the first, the surface-active macromer is added to the monomer mix used to form the polymeric object. In the second, the polymeric object is immersed in an aqueous dispersion of the surface-active macromer, a cross-linking agent, and a free radical initiator and the immersion is exposed to ultraviolet light to form a permanent, cross-linked surface coating on the object. Illustrations of these techniques are shown in the Examples of this application.

The polymeric objects whose surfaces may be modified by these techniques include polymers having a wide variety of compositions and shapes. Polymeric objects of particular concern in the development of this invention were contact lenses and the particular surface modification sought was to increase surface wettability without sacrificing otherwise beneficial bulk properties of the polymeric material (especially oxygen permeability). Although the utility of the macromonomers of this invention will be further illustrated by referring particularly to their incorporation into contact lenses, it will be understood that the utility of the macromonomers of this invention is not so limited.

One class of contact lenses whose surface may be usefully modified by the macromonomers of this invention are soft hydrogel lenses. Conventional monomer systems for such lenses employ a hydrophilic monoolefinic monomer (i.e., a monoethylenically unsaturated monomer) and a polyolefinic (usually diolefinic) monomer (e.g., a polyethylenically unsaturated compound which functions as a cross-linking agent) in an amount sufficient to insolubilize the resulting hydrophilic hydrogel but insufficient to destroy the hydrophilic properties. Mixtures of hydrophilic monoolefinic monomers are used as well as mixtures of cross-linking agents. Other monomers which are copolymerizable with the hydrophilic monomer are also used to adjust various properties of the polymeric material, as is well known in the art.

Illustrative hydrophilic monomers include water soluble monoesters of (meth)acrylic acid with an alcohol having an esterifiable hydroxyl group and at least one additional hydroxyl group such as the mono- and polyalkylene glycol monoesters of (meth)acrylic acid, e.g., ethylene glycol mono(meth)acrylate, diethylene glycol mono(meth)acrylate, propylene glycol mono(meth)acrylate, dipropylene glycol mono(meth)acrylate, and the like; the N-alkyl and N,N-dialkyl substituted (meth)acrylamides such as N-methyl (meth)acrylamide, N,N-dimethyl (meth)acrylamide, and the like; N-vinylpyrrolidone and the alkyl substituted N-vinyl pyrrolidones; glycidyl (meth)acrylates; the unsaturated amines; the alkoxy ethyl acrylates; mixtures thereof; and others known to the art.

Illustrative di- or higher polyfunctional species employed as cross-linking agents are divinylbenzene, ethylene glycol di(meth)acrylate, propylene glycol di(meth)acrylate, and the (meth)acrylate esters of polyols such as triethanolamine, glycerol, pentaerythritol, butylene glycol, diethylene glycol, triethylene glycol, tetraethylene glycol, mannitol, and sorbitol. Further illustrations include N,N-methylene-bis-(meth)acrylamide, sulfonated divinylbenzene, and divinylsulfone.

Illustrative of other copolymerizable monomers are hydrophobic (meth)acrylic esters such as alkyl (meth)acrylates wherein the alkyl moiety contains 1-5 carbon atoms.

While soft, hydrophilic, gel-type lenses may be modified by the macromonomers of this invention, of greater interest is the modification of lenses prepared from a formulation including at least one silicone monomer and at least one hydrophilic monomer. Included in this class of materials are soft contact lens formulations (both hydrogel and nonhydrogel) and rigid gas permeable contact lens formulations.

Preferred soft hydrogel formulations are those described in U.S. patent application Ser. Nos. 07/363,662 filed Jun. 7, 1989, now U.S. Pat. No. 5,034,461 and 07/364,204 filed May 2, 1989 now U.S. Pat. No. 5,070,215, the entire contents of which are incorporated herein by reference. Other examples of useable formulations are found in U.S. Pat. Nos. 4,136,250; 4,740,533; 4,711,943; 4,189,546; and 4,153,641.

One type of presently preferred hydrogel formulations incorporate urethane prepolymers of the general formula:

E(*D*A*D*G)a*D*A*D*E' or

E(*D*G*D*A)a*D*G*D*E' where

A denotes a divalent polymeric radical represented by the general formula chosen from the group of

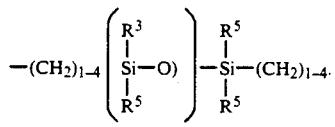

wherein $R^S$ denotes an alkyl radical or a short chain fluorinated alkyl radical with 1 to 3 carbon atoms; and p provides a moiety weight of 400 to 10,000;

D denotes an alkyl diradical, an alkyl cycloalkyl diradical, a cycloalkyl diradical, an alkylaryl diradical or an aryl diradical, with 6 to 30 carbon atoms;

G denotes an alkyl diradical, a cycloalkyl diradical, an alkyl cycloalkyl diradical, an aromatic diradical or an alkylaromatic diradical with 1 to 40 carbon atoms which may have ether, thio, or amine linkages in the main chain;

* denotes a urethane or ureido linkage; and

E and E' denote polymerizable unsaturated organic radicals represented by the general chemical formula

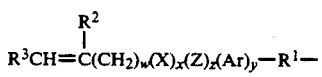

wherein $R^1$ denotes a divalent alkylene radical with 1 to 10 carbon atoms;

$R^2$ denotes a —H or —CH$_3$ radical;

$R^3$ denotes a —H radical or an alkyl radical with 1 to 6 carbon atoms or a

radial where

Y is —O—, —S— or —NH— and $R^4$ denotes radical with 1 to 12 carbon atoms;

X denotes

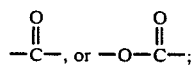

Z denotes —O—, —S—, or —NH—;

Ar denotes an aromatic radical with 6 to 30 carbon atoms;

a is at least 1;

w is 0 to 6;

x is 0 or 1;

y is 0 or 1; and z is 0 or 1.

The isocyanates which can be used in preparation of these urethane prepolymers include toluene diisocyanate, 4,4'-diphenyl diisocyanate, 4,4'-diphenylene methane diisocyanate, p-phenylene diisocyanate, dianisidine diisocyanate, 1,5 napthalene diisocyanate, 4,4'-diphenyl ether diisocyanate, 4,4'(dicyclohexyl)methane diisocyanate, 1,3-bis-(isocyanato methyl)cyclohexane, cyclohexane diisocyanato, tetrachlorophenylene diisocyanate, isophorone diisocyanate, and 3,5-diethyl-4,4'-diisocyanato diphenyl methane.

Other diisocyanates which may be used are higher molecular weight diisocyanates formed by reacting polyamines which are terminally capped with primary or secondary amines, or polyhydric alcohols with excess of any of the above described diisocyanates. In general, these high molecular weight diisocyanates will have the general formula

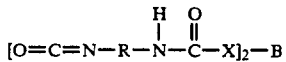

wherein R is a divalent organic radical with 2 to about 20 carbon atoms, X is —O—, or —NR'—, where R is —H or a lower alkyl, and B is a divalent organic radical.

The diisocyanate is reacted with low molecular weight diols or glycols such as 2,2-(4,4'dihydroxydiphenyl)-propane (bisphenol-A); 4,4'-iso-propylidine dicyclohexanol (hydrogenated biphenol-A); ethoxylated bisphenol-A; propoxylated bisphenol-A; 2,2-(4,4'-dihydroxydiphenyl)-pentane; α,α'-(4,4'-dihydroxydiphenyl)-p-diisopropyl benzene; 1,3 cyclohexane diol; 1,4-cyclohexane diol; 1,4-cyclohexane dimethanol; bicyclic and tricyclic diols such as 4,8-bis-(hydroxymethyl)-tricyclo [5.2.1.0$^{2,6}$] decane, neopentyl glycol, 1,4 butanediol, 1,3-propanediol, 1,5-pentanediol, diethylene glycol, triethylene glycol and the like.

These hard segments form hard domains in the final polymer or copolymer by association via hydrogen bonding with other rigid segments. The degree of association within the hard domain can be modified by controlling the amount of hydrogen bonding between the segments by either 1) decreasing the overall weight content of the hard segment in the prepolymer by increasing the molecular weight of the soft segment or 2) by decreasing the amount of hydrogen bonding density in the hard segment by either using relatively soft, longer chained diols, or by using primary amines or secondary amines capped low molecular weight compounds in conjunction with the diisocyanates rather than the diols.

The hard segments are then reacted with a relatively high molecular weight polymer which is α,ω-endcapped with two active hydrogens, usually hydroxyl groups. These segments form the so-called soft segment of the prepolymer. Various types of high molecular weight polymers can be used including in general polymers of the following formulae a) $HO(CH_2)(R^PO)_n(CH_2)OH;$ b) $HO(CH_2)(R^PO)_m(CH_2)OH;$ and c)
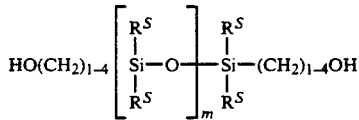

Formulae a) represents polyoxyalkyleneglycols. These diols include polymers prepared from the epoxides: ethylene oxide 1,2-propylene oxide, 1,2-butylene oxide, 2,2 epoxydecane, 1,2-epoxyoctane, 2,3-epoxy norborane, 1,2-epoxy-3-ethoxy propane, 2,2-epoxy-3-phenoxypropane, 2,3-epoxypropyl-4-methoxy phenyl ether, tetrahydrofluran, 1,2-epoxy-3-cyclohexyloxy propane, oxetane, 1,2-epoxy-5-hexene, 1,2-epoxyethylbenzene, 1,2-epoxy-1-methoxy-2-methylpropane, benzyloxy propylene oxide, the like and combinations thereof.

The preferred polymers of this class are polypropylene glycols of molecular weights, 2000, 3000 and 4000 and more and polyoxyethylene polyoxypropylene block copolymers with molecular weight greater than 2000.

Formulae b) represents polyfluoroethers with $\alpha,\omega$-active hydrogens. This class of polymers can be synthesized as taught in U.S. Pat. No. 3,810,874. Generally, these polymers should have molecular weights between 400 and 10,000.

Formulae c) represents $\alpha,\omega$-dihydroxyl alkyl endblocked polysiloxane which for the purpose of the present invention should have a molecular weight in the range of 400 to 10,000. These polysiloxanes can be synthesized by reacting a disiloxane of the general formula

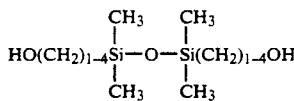

with cyclopolydimethyl siloxane under acidic conditions.

Alternately, the disiloxane can be replaced with dimethoxydimethylsilane or diethoxy dimethyl silane to produce the $\alpha,\omega$- dihydroxy endcapped polysiloxanes.

The endcapping monomers used in the prepolymer are generally represented by the formula

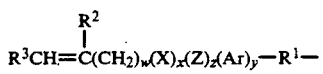

as defined supra. The Stage B reaction product is reacted with an as defined supra excess of suitable acrylate or methacrylate esters containing a hydroxy or amine group on the non-acrylate or non-methacrylate portion of the monomer to form the endcaps of the above formula. Suitable endcap monomers include hydroxyethyl acrylate, hydroxyethyl methacrylate, aminoethyl methacrylate, 3-hydroxypropyl methacrylate, amino propyl methacrylate, hydroxyhexylacrylate, t-butylaminoethyl methacrylate, monoacrylate or monomethacrylate esters of bisphenol-A and/or bisphenol-B.

The urethane prepolymers are formed by two general synthetic approaches. One approach produces the hard-soft-hard prepolymer while the second approach produces the soft-hard-soft prepolymer.

The scheme used to produce hard-soft-hard urethane prepolymer employed three stages. In the first stage (STAGE A) 2 mole equivalents of diisocyanate are reacted with about 1 mole equivalent low molecular weight diols. If these diols are represented by the symbol ♦ G ♦, where ♦ denotes a hydroxyl radical and G represents the rest of the diol compound, and the diisocyanate functional compound is represented by •D• where • represents an isocyanate radical, the STAGE A reaction can be schematically represented as follows:

where * denotes a urethane or a ureido linkage. STAGE A produces a so-called "Hard" segment. As is known to those skilled in polymer chemistry, the product •D*G*D• is the mathematical average of all reaction product molecules. The reaction product of the actual reaction will contain •O• and •D(*G*D)$_c$*G*D with $c \geq 2$. Again, the formulas are numerical averages.

STAGE B involves reacting about one half mole equivalent of a $\alpha,\omega$-diol endcapped long chain polymer with the reaction product of STAGE A. If ♦ A ♦ represents the long chain diol the STAGE B Reaction is

In STAGE C, the reaction product from STAGE B is reacted with a molar excess of an endcapping monomer which has: 1) hydroxyl or amine functionality; and 2) some polymerizable unsaturation. If the endcapper is represented by the symbol E ♦, where ♦ is —OH or —NH$_2$ or —NH—, the reaction proceeds generally as

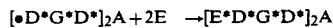

Optionally, STAGE B can be run with molar excess of A to produce multiblock polymers of the general formula •(D*G*D*A)$_a$*D*G*D• where a is at least 1. This reaction product would be endcapped in STAGE C above.

The second general synthetic scheme using the same nomenclature described is represented by the following general formulae:

STAGE A

STAGE B

STAGE C

In general, each of the reaction stages is run until the reactive step is complete. Reaction progress in STAGES A and B reactants can be monitored by acid base titration. The isocyanate content was calculated by the difference of acid equivalents between a stock solution dibutylamine and its reaction product with the diisocyanate reaction intermediate. The reaction was also monitored by ATR-IR for the appearance/disappearance of peaks at 1700 cm$^{-1}$, which indicated the presence of

and 2250 cm$^{-1}$ which indicated consumption of —N=C=O.

The synthesis of the prepolymer may be run neat or in solution. A wide range of aprotic solvents can be used to synthesize the prepolymers of the present invention. Solvents useful in the synthesis include toluene, methylene, chloride, benzene, cyclohexane, hexane, heptane and the like. Preferred solvents are toluene, methylene chloride and mixtures thereof.

Reaction of the prepolymer precursors may be accomplished in the presence or absence of catalysts for urethane reactions, such catalysts being well known in the art. The first step of prepolymer synthesis where diisocyanate is first reacted with a short carbon chain (2 to 30 carbon atoms) diol, particularly where an aromatic diisocyanate is used, proceeds very rapidly, even in the absence of any catalyst. In fact, during the step of reacting diisocyanate and short chain diol, temperature control may be required in order to avoid/minimize side reactions.

Preferably, the first step of prepolymer synthesis in accordance with the present invention is carried out below about 100° C., most suitably within the range of from about 60° C. to about 90° C. Thereafter, the second step of the reaction is carried out at comparable temperatures, preferably within the range of from about 40° C. to 70° C. The final step of prepolymer formation suitably is effected at temperatures of from about room temperature to about 100° C., with a narrow range of from about 40° C. to about 50° C. being most preferred. As will be apparent to those skilled in the art, optimal reaction conditions, such as temperatures and duration, are selected for each individual reaction system to achieve conditions that produce a favorable rate of reaction without fostering undesirable side reactions.

Among the suitable catalysts for use in prepolymer formation are tin salts and organic tin esters, such as dibutyl tin dilaurate, tertiary amines, such as triethyl diamine and other recognized catalysts, such as 1,4-diaza (2.2.2)-bicyclooctane (DABCO).

These silicone-containing urethane prepolymers may be copolymerized with a wide variety of hydrophilic monomers to produce soft hydrogel contact lenses. Hydrophilic monomers suitable for this use include 2-hydroxyethylmethacrylate, N-vinyl pyrrolidone, (meth)acrylamide, vinyl acetamide, and other ethylenically unsaturated hydrophilic monomers. Further co-monomers may also be added to enhance wetting or to modify other properties as is generally known to those skilled in the art.

Another presently preferred hydrogel formulation incorporates silicone-containing vinyl carbonate or vinyl carbamate prepolymers of the general formula:

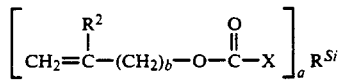

wherein
X denotes an —O—, —S—, or —NR$^3$— divalent radical;
R$^{Si}$ denotes a silicone containing organic radical;
R$^2$ denotes —H or —CH$_3$;
A is 1, 2, 3, or 4; and
b is 0 or 1.

Suitable silicone-containing organic radicals (R$^{Si}$) include the following:

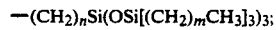

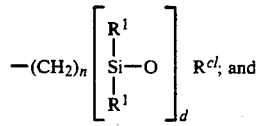

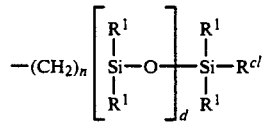

where R$^1$ denotes a monovalent organic radical such an alkyl to 6 carbon atoms, or a fluoroalkyl radical with 1 to 6 carbon atoms;
R$^{cl}$ denotes —(CH$_2$)$_p$—O—C—CH=CH$_2$
p is 1 to 6; and
d is 1-200, and
where n is 1, 2, 3, or 4' and m is 0, 1, 2, 3, 4' or 5.

The silicone-containing vinyl carbonate/carbamate monomers specifically include 3-[tris(trimethylsiloxy)-silyl]propyl vinyl carbonate;
1,3-bis[4-(vinyloxycarbonyloxy)but-1-yl]tetramethyl-disiloxane;
3-(trimethylsilyl)propyl vinyl carbonate;
t-butyldimethylsiloxyethyl vinyl carbonate; trimethylsilylmethyl vinyl carbonate; trimethylsilylethyl vinyl carbonate;
2,2,2-trifluoroethyl vinyl carbonate; t-butyl vinyl carbonate;
3-[tris(trimethylsiloxy)silyl]propyl vinyl carbonate;
2,2,2-trifluoroethyl vinyl carbamate;
1,1,1,3,3,3-hexafluoro-2-propyl vinyl carbonate;
3-(vinyloxycarbonylthio)propyl-[tris(trimethylsiloxy)-silane];
3-[tris-(trimethylsiloxy)silyl]propyl vinyl carbamate; "V$_2$D$_{25}$",
2,2,2-trifluoro-1-phenylethyl vinyl carbonate; 1-adamantane vinyl carbonate, 1-adamantanethyl vinyl carbonate, 1-adamantaneethyl vinyl carbonate; and 1-adamantane vinyl carbamate.

Preferred nonhydrogel soft contact lens formulations are mixtures of polymerizable polysiloxanes containing fluorinated side chains and internal wetting agents. Further components such as toughening agents, crosslinking agents, and other auxiliary modifiers are desirably present as taught in U.S. Pat. No. 4,810,764'the entire content of which is incorporated herein by reference.

Polymerizable, fluorinated polysiloxanes employed in this embodiment of the invention are described by the general formula:

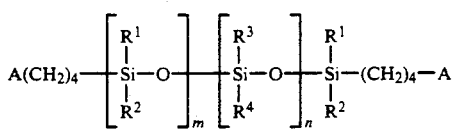

where A denotes an activated unsaturated group, $-R^1$ and $R^2$ independently denote alkyl radicals with 1 to 6 carbon atoms or phenyl radicals; $R^3$ and $R^4$ independently denote alkyl radicals with 1 to 6 carbon atoms, phenyl radicals, or fluorinated alkyl radicals with 1 to 6 carbon atoms, provided that at least one of $R^3$ or $R^4$ is a fluorinated alkyl radical with 1 to 6 carbon atoms; $m+n$ is at least 1; and n is at least 1.

Internal wetting agents ("hydrophilic monomers") useful in this embodiment of the invention include N-alkyenoyl trialkylsilyl aminates (hereinafter "NATA") (described in U.S. Pat. No. 4,652,622) represented by the general formula $$CH_2=C(E)C(0)N(H)CH(G)(CH_2)_mC(O)OSi(R)_3$$

wherein
  E is H or $CH_3$
  G is $(CH_2)_xC(0)OSi(R)3$ or
  R is $CH_3$, $C_2H_5$ or $C_3H_7$,
  m is an integer from 1 to 15,
  x is an integer from 1 to 10, and
  m+x is an integer from 1 to 15

Acryloyl- and methacryloyl-, mono- and dicarboxylic amino acids, hereinafter NAA, impart desirable surface wetting characteristics to polysiloxane polymers, but precipitate out of siloxane monomer mixtures before polymerization is completed. NAA can be modified to form trialkylsilyl esters which are more readily incorporated into polysilocane polymers. The preferred NATA's are trimethylsilyl-N-methacryloylglutamate, triethylsilyl-N-methacryloylglutamate, trimethyl-N-methacryloyl-6-aminohexanoate, trimethylsilyl-N-methacryloyl-aminododecanoate, and bis-trimethylsilyl-N-methacryloyl aspartate.

The preferred internal wetting agents are oxazolones of the general formula

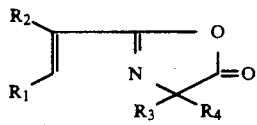

where
  $R_1$ and $R_2$ independently denote H or $CH_3$; and
  $R_3$ and $R_4$ independently denote methyl or cyclohexylradicals.

These preferred internal wetting agents specifically include 2-isopropenyl-4,4-dimethyl-2-oxazolin-5-one (IPDMO), 2-vinyl-4,4-dimethyl-2-oxazolin-5-one (VDMO), cyclohexane spiro-4'-(2'isopropenyl-2'-oxazol-5'-one) (IPCO), cyclohexane-spiro-4'-(2'-vinyl-2'-oxazol-5'-one) (VCO), and 2-(-1-propenyl)-4,4-dimethyl-oxazol-5-one (PDMO).

These preferred internal wetting agents have two important features which make them particularly desirable wetting agents: (I) They are relatively non-polar and are compatible with the hydrophobic monomers (the polysiloxanes and the toughening agents), and (2) They are converted to highly polar amino acids on mild hydrolysis, which impart substantial wetting characteristics. When polymerized in the presence of the other components, a copolymer is formed. These internal wetting agents result through the carbon-carbon double bond with the endcaps of the polysiloxane monomers, and with the toughening agents to form copolymeric materials particularly useful in biomedical devices, especially contact lenses.

These oxazolones are prepared by the general reaction sequence

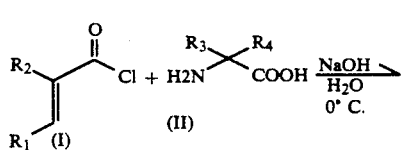

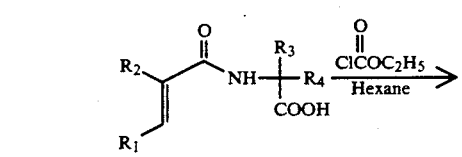

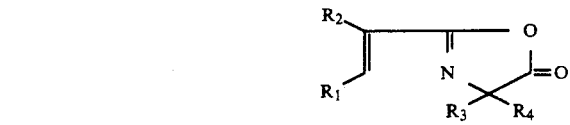

The first step is a Shotten-Bauman acrylation of an amino acid. Upon completion of this step the polymerizable functionality is introduced by using either acryloyl or methacryloyl chloride.

Rigid gas permeable contact lens formulations which are suitable for the practice of this invention are silicone-based copolymers prepared from siloxanylalkyl esters of methacrylic acid and other acrylate, methacrylate, or itaconate monomers in many known formulations. See U.S. Pat. Nos. 4,424,328; 4,463,149; 4,664,479; and 4,686,267 for examples of such formulations.

This invention is further described by the following Examples, which are intended to be illustrative, not limiting.

EXAMPLES

Syntheses of Random Copolymers

Example 1

Polymerization of 1-Vinyl-2-pyrrolidinone

Distilled 1-vinyl-2-pyrrolidinone, (NVP) 40 g, 2-mercaptoethanol, 2.80 g and azobisisobutyronitrile (AIBN, recrystallized from ethanol) 0.59 g were combined with 100 mL of anhydrous tetrahydrofuran (THF) in a 250 mL three neck flask. The flask was also fitted with a mechanical stirrer and a reflux condenser. A slow stream of nitrogen was used to deoxygenate the solution for 15 minutes. After 24 hours of reflux under a nitrogen atmosphere, no vinyl protons could be detected in the 60 Mhz NMR spectra (6.5–7.0 ppm). The hydroxy-terminated polymer was precipitated from 2 L of anhydrous ethyl ether. The solid was dissolved in 200 ml of THF and the precipitation repeated twice. The white solid, 29.37 g (69% yield), was dried under reduced pressure.

Example 2

Synthesis of a Polyvinyl Pyrrolidinone (PVP) Macromer

Hydroxy-terminated PVP, 9.0 g (from Example 1), was dissolved in 90 mL of chloroform, in a 250 mL 3-neck flask fitted with a magnetic stirrer, a reflux condenser, and an addition funnel. Dibutyltin dilaurate, 32.5 mg, and butylated hydroxy toluene, 2.1 mg (BHT), were added. Isocyanatoethyl methacrylate, 0.86 g (ICEM) in 10 mL CHCl$_3$, was added dropwise. Following the addition the solution was heated to reflux. After 3 hours no ICEM could be detected by infrared analysis. The reaction mixture was then slowly added to 6 L of anhydrous ethyl ether and the solid collected. Precipitation of the PVP macromer was repeated, from ethanol into 4 L of ethyl ether. After drying at 30° C. under reduced pressure the yield of macromer was 7.1 g (78%). The Mn (number average molecular weight) and Pd (polydispersity) values were 1,986 and 1.4 (vs. polyethylene glycol standards).

Example 3

Copolymerization of OFPMA and PVP Macromer 1H,1H,5H Octafluoropentylmethacrylate, (OFPMA) 0.75 g, PVP macromer (Example 2), 5.0 g, 2-mercaptoethanol, 105 uL, and AIBN (recrystallized from ethanol), 8.2 mg, were combined with 100 mL of anhydrous tetrahydrofuran (THF) in a 250 mL three neck flask. The flask was also fitted with a mechanical stirrer and a reflux condenser. A slow stream of nitrogen was used to deoxygenate the solution for 15 minutes. After 20 hours of reflux under a nitrogen atmosphere the hydroxy terminated polymer was precipitated from 2 L of anhydrous ethyl ether. The solid was dissolved in 200 ml of THF and the precipitation repeated once. The white solid was dried under reduced pressure leaving 4.14 g, a 72% yield.

Example 4

Polymerization of N,N-Dimethylacrylamide(DMA)

Distilled DMA, 20 g, 2-mercaptoethanol, 280 uL, and AIBN (recrystallized from ethanol), 0.33 g, were combined with 100 mL of anhydrous tetrahydrofuran (THF) in a 250 mL three neck flask. The flask was also fitted with a mechanical stirrer and a reflux condenser. A slow stream of nitrogen was used to deoxygenate the solution for 15 minutes. After 20 hours of reflux under a nitrogen atmosphere no vinyl protons could be detected in the 60 Mhz NMR spectra (6.5-7.0 ppm). The hydroxy terminated polymer was precipitated from 2 L of anhydrous ethyl ether. The solid was dissolved in 100 ml of THF and the precipitation repeated. The white solid was dried under reduced pressure at 30° C. The yield was 15.5 g and the Mn (number average molecular weight), Mw (weight average molecular weight) and Pd (polydispersity) values were 6,700, 11,318 and 1.7 (vs. polyethylene glycol standards).

Example 5

Preparation of a DMA Macromonomer

Hydroxy terminated copolymer, 12 g (from Example 4) was dissolved in 90 mL of chloroform, in a 250 mL 3-neck flask fitted with a magnetic stirrer and a reflux condenser and an addition funnel. Dibutyltin dilaurate, 36.9 mg, and butylated hydroxy toluene (BHT), 10.2 mg, were added. Isocyanatoethyl methacrylate, 0.30 g (ICEM) in 10 mL CHCl$_3$, was added dropwise. Following the addition the solution was heated to reflux. After 48 hours no ICEM could be detected by infrared analysis. The reaction mixture was then slowly added to 2 L of anhydrous ethyl ether and the solid collected. The precipitation was repeated a second time followed by drying at 30° C. under reduced pressure. The yield of macromer was 8.6 g. The Mn, Mw and Pd values were 4,400, 7,900 and 1.8 (vs. polyethylene glycol standards).

Example 6

Copolymerization of OFPMA and DMA Macromer

OFPMA, 1.2 g, DMA macromer (Example 5), 6.7 g, 2-mercaptoethanol, 105 uL, and AIBN (recrystallized from ethanol), 8 mg, were combined with 100 mL of anhydrous tetrahydrofuran (THF) in a 250 mL three-neck flask. The flask was also fitted with a magnetic stirrer and a reflux condenser. A slow stream of nitrogen was used to deoxygenate the solution for 15 minutes. After 72 hours of reflux under a nitrogen atmosphere the conversion to copolymer was 44%, (by NIR analysis). Addition of 25 mg AIBN and 48 hours refluxing, (120 hours total) gave a 60% conversion to copolymer. Precipitation into 2 L of anhydrous ethyl ether, followed by drying at reduced pressure left 6 g of copolymer with Mn, Mw, and Pd values of 4,600, 8,100, and 1.8 (vs. PEG standards).

Examples 7-10

Copolymerization of 1H,1H,5H Octafluoropentylmethacrylate and Methoxy polyethylene glycol monomethacrylates

Example 7

A solution was prepared by dissolving 9.1 g of methoxy polyethylene glycol 1,000 monomethacrylate in 100 mL of toluene. The solution was carefully transferred to a 250 mL three neck flask fitted with a magnetic stirrer and a condenser. To this, 9.1 g of 1H,1H,5H Octafluoropentylmethacrylate (OFPMA), 1.26 g of distilled thioglycolic acid (TGA) and 0.071 g of azobisisobutyronitrile (AIBN) were added. AIBN was recrystallized from ethanol before use. The solution was then deoxygenated using nitrogen for 15 minutes and then placed under a passive nitrogen blanket. After stirring for 16 hours at 60° C. the percent conversion was determined to be 95-98% by near infrared (NIR) analysis. The number average molecular weight was determined by size exclusion chromatography ("SEC") vs. polystyrene and by end group titration. The Mn values were 2,902 and 1,815 respectively. Results are shown in Table I.

Examples 8-9

The procedure of Example 7 was repeated using higher relative amounts of methoxy polyethylene glycol 1000 monomethacrylate. THF replaced toluene as the solvent in Example 9. Results are shown in Table I.

Example 10

The procedure of Example 7 was repeated using methoxy polyethylene glycol 5000 monomethacrylate and using THF as the solvent. Results are shown in Table I.

TABLE I

ACID TERMINATED COPOLYMERS

| Example # | Type | Composition | Solvent | Rxn time | Mn | Mw | Pd |
|---|---|---|---|---|---|---|---|
| 7 | OFPMA/Peo 1k | 80/20 | Toluene | 16h | 2902 | 5370 | 1.8 |
| 8 | OFPMA/Peo 1k | 70/30 | Toluene | 72h | 2300 | 3400 | 1.44 |
| 9 | OFPMA/Peo 1k | 50/50 | THF | 24h | 3163 | 5287 | 1.7 |
| 10 | OFPMA/Peo 5k | 80/20 | THF | 24h | 12.6k | 9400 | 1.34 |

Example 11

Copolymerization of 3-Methacryloyloxypropyltris(trimethylsiloxy)silane and Methoxy polyethylene glycol 1,000 monomethacrylate A solution was prepared by dissolving 7.1 g of methoxy polyethylene glycol 1,000 monomethacrylate in 100 ml of toluene. The solution was carefully transferred to a 250 ml three-neck flask fitted with a magnetic stirrer and a condenser. To this, 12.8 g of 3-methacryloyloxypropyltris(trimethylsiloxy)silane (TRIS), 1.0 g of distilled thioglycolic acid (TGA) and 0.059 g of azobisisobutyronitrile (AIBN) were added. AIBN was recrystallized from ethanol before use. The solution was then deoxygenated using nitrogen for 15 minutes and then placed under a passive nitrogen blanket. After stirring for 16 hours at 60° C. the percent conversion was determined to be 95-98% by near infrared (NIR) analysis. The number average molecular weight was determined by size exclusion chromatography vs. polystyrene and by end group titration. The Mn values were 2,895 and 2,083 respectively. The polydispersity of the copolymer was 1.5.

Examples 12-17

Copolymerization of 1H,1H,5H Octafluoropentylmethacrylate and Methoxy polyethylene glycol monomethacrylates

Example 12

OFPMA, 15 g, methoxy polyethylene glycol 1,000 monomethacrylate, 50 g, 2-mercaptoethanol, 2.34 g, and AIBN (recrystallized from ethanol), 0.164 g, were combined with 500 mL of a 1:1 mixture of THF and methanol(MEOH) in a 1 L, three-neck flask. The flask was also fitted with a magnetic stirrer and a reflux condenser. The mixture was stirred until all reagents were in solution. A slow stream of nitrogen was then used to deoxygenate the solution for 15 minutes. After 7 hours of reflux under a nitrogen atmosphere the conversion to copolymer was 99+% (by NIR analysis). Solvent was removed by flash evaporation leaving a viscous oil, which upon standing formed a wax-like solid. Values for Mn, Mw and Pd were determined vs. polystyrene, (Mn=3,700, Mw=6,300 and Pd=1.72). Results are shown in Table II.

Examples 13-17

The procedure of Example 12 was repeated using methoxy polyethylene glycol monomethacrylate in different molecular weights and relative amounts as indicated in Table II which also summarizes the results obtained.

TABLE II

HYDROXY TERMINATED COPOLYMERS

| Example # | Type | Composition | Conversion, % (by NIR) | time hrs | Mn | Mw | Pd |
|---|---|---|---|---|---|---|---|
| 12 | OFPMA/Peo 400 | 50/50 | 95 | 48 | 2190 | 3400 | 1.56 |
| 13 | OFPMA/Peo 1k | 50/50 | 99 | 72 | 3700 | 6300 | 1.72 |
| 14 | OFPMA/Peo 5k | 80/20 | 90 | 72 | 10.5k | 16.1k | 1.52 |
| 15 | OFPMA/Peo 5k | 50/50 | 75 | 65 | 10k | 12.6k | 1.27 |
| 16 | OFPMA/Peo 2k | 50/50 | 79 | 65 | — | — | — |
| 17 | OFPMA/Peo 2k | 80/20 | 95 | 48 | 3900 | 4800 | 1.22 |

Examples 18-21

Surface Active Macromonomer Preparation

Example 18

Distilled glycidyl methacrylate, 1.83 g, p-methoxyphenol, 2.5 mg (MEHQ), and two drops of N,N-dimethyldodecylamine were added to the solution from Example 7. The mixture was allowed to reflux under a nitrogen atmosphere for 5 hours. The solution was washed 3 times with dilute sodium carbonate solution and once with water. The organic layer was dried over magnesium sulfate, and toluene removed by flash evaporation at reduced pressure. The residue, 18.12 g (85% yield), of viscous yellow macromonomer had Mn values of 3,353 (by SEC vs. polystyrene) and 3,416 (by vapor phase osmometry, vpo). The polydispersity (Pd) of the macromonomer was 1.9. Results are summarized in Table III.

Examples 19-21

The procedure of Example 18 was repeated using the solutions from Examples 8-10. The copolymers of Examples 9-10 were isolated and redissolved in dioxane for surface active macromonomer preparation. Results obtained are shown in Table III.

TABLE III

SURFACE ACTIVE MACROMERS

| Example # | Type | Composition | Solvent | Rxn time | Mn | Mn | Pd |
|---|---|---|---|---|---|---|---|
| 18 | OFPMA/Peo 1k | 80/20 | Toluene | 5h | 3353 | 6493 | 1.9 |
| 19 | OFPMA/Peo 1k | 70/30 | Toluene | 5h | 2057 | 4587 | 2.2 |
| 20 | OFPMA/Peo 1k | 50/50 | Dioxane | 5h | 2545 | 4351 | 1.7 |

TABLE III-continued
SURFACE ACTIVE MACROMERS

| Example # | Type | Composition | Solvent | Rxn time | Mn | Mn | Pd |
|---|---|---|---|---|---|---|---|
| 21 | OFPMA/Peo 5k | 80/20 | Dioxane | 5h | 8142 | 12k | 1.5 |

Examples 22-27

Surface Active Macromonomer Preparation

Example 22

Hydroxy terminated copolymer, 41.744 g (from Example 12), was dissolved in 225 mL of THF, in a 500 mL 3-neck flask fitted with a magnetic stirrer, a reflux condenser, and an addition funnel. Dibutyltin dilaurate, 1.57 g, and butylated hydroxy toluene, 10 mg, were added. Isocyanatoethyl methacrylate, 1.98 g (ICEM) in 25 mL CHCl$_3$, was added dropwise. Following the addition the solution was heated to reflux. After 16 hours 0.2% ICEM was detected by infrared analysis. Methanol, 5 mL, was added to react with the slight excess of ICEM. Chloroform was then removed by flash evaporation. The residue was left under high vacuum overnight to remove residual solvent leaving 42.4 g of wax-like semisolid. Values for the Mn, Mw, and Pd were determined vs polystyrene standards. Results are summarized in Table IV.

Examples 23-27

The procedure of Example 22 was repeated using hydroxy terminated copolymers (dissolved in chloroform) from Examples 13-17. Results are shown in Table IV.

TABLE IV

| Example # | Type | Composition | Solvent | Time hrs | Mn | Mn | Pd |
|---|---|---|---|---|---|---|---|
| 22 | OFPMA/Peo 400 | 50/50 | THF | 16 | 2500 | 4600 | 1.8 |
| 23 | OFPMA/Peo 1k | 50/50 | CHCl$_3$ | 16 | 4000 | 6700 | 1.69 |
| 24 | OFPMA/Peo 5k | 80/20 | CHCl$_3$ | 12 | 4100 | 4500 | 1.12 |
| 25 | OFPMA/Peo 5k | 50/50 | CHCl$_3$ | 16 | 9900 | 12.5K | 1.26 |
| 26 | OFPMA/Peo 2k | 50/50 | CHCl$_3$ | 16 | — | — | — |
| 27 | OFPMA/Peo 2k | 80/20 | CHCl$_3$ | 16 | 3800 | 4500 | 1.19 |

Example 28

Surface Active Macromonomer Preparation

Distilled glycidyl methacrylate, 1.58 g, p-methoxyphenol, 2.8 mg (MEHQ), and two drops of N,N-dimethyldodecylamine were added to the solution from Example 11. The mixture was allowed to reflux under a nitrogen atmosphere for 5 hours. The solution was washed 3 times with dilute sodium carbonate solution and once with water. The organic layer was dried over magnesium sulfate, and toluene was removed by flash evaporation at reduced pressure. The residue, 17.64 g (84% yield), of viscous semi-solid macromonomer had Mn values of 1,593 (by SEC vs. polystyrene) and 1,918 (by vapor phase osmometry, vpo). The polydispersity of the macromonomer was 1.6.

Example 29

Surface Active Macromonomer Preparation

Hydroxy terminated copolymer, 3.14 g (from Example 3), was dissolved in 90 mL of chloroform, in a 250 mL 3-neck flask fitted with a magnetic stirrer, a reflux condenser, and an addition funnel. Dibutyltin dilaurate, 3 drops and butylated hydroxy toluene, 3 mg, were added. Isocyanatoethyl methacrylate, 89 uL (ICEM) in 10 mL CHCl$_3$, was added dropwise. Following the addition the solution was heated to reflux. After 12.5 hours no ICEM could be detected by infrared analysis. The reaction mixture was then slowly added to 2 L of anhydrous ethyl ether and the solid collected. After drying at 30° C. under reduced pressure the yield of macromer was 3 g. The Mn, Mw and Pd values were 4,900, 5,900 and 1.2 (vs. polyethylene glycol standards).

Example 30

Surface Active Macromonomer Preparation

Hydroxy terminated copolymer, 4.5 g, (from Example 6) was dissolved in 90 mL of chloroform in a 250 mL 3-neck flask fitted with a magnetic stirrer, a reflux condenser, and an addition funnel. Dibutyltin dilaurate, 2 drops and butylated hydroxy toluene, 3 mg, were added. Isocyanatoethyl methacrylate, 93 uL (ICEM) in 10 mL CHCl$_3$, was added dropwise. Following the addition the solution was heated to reflux. After 20 hours a trace of ICEM could be detected by infrared analysis. The reaction mixture was then slowly added to 2 L of anhydrous ethyl ether and the solid collected. After drying at 30° C. under reduced pressure the yield of macromer was 3.14 g. The Mn, Mw and Pd values were 4,900, 8,900 and 1.8 (vs. PEG standards).

Examples 31-42

Surface Tension Determination Using the Wilhelmy Plate Technique

Macromonomer solutions were prepared with distilled water at molar concentrations of $10^{-2}$–$10^{-6}$. The surface tension of each solution was measured by the Wilhelmy Plate technique on a Wettek, model SFA-212, instrument. A test solution was placed in a jacketed beaker, which had been cleaned with chromic/sulfuric acid for 40 minutes, rinsed with clean water and dried overnight at 120° C. Data was collected by dipping a glass cover slip (cleaned by passing through a flame) into each solution several times at the following conditions:

| | |
|---|---|
| Platform speed | 0.16 mm/sc |
| Immersion depth | 20.0 mm |
| Temperature | 34 ± 1° C. |

The data was analyzed using WETTEK 12 software. Results are shown below in Table V.

TABLE V
SURFACE TENSION DATA

| Example # | Macromer example # | Molar conc. | Temp. °C. | Surface Tension dyne/cm |
|---|---|---|---|---|
| 31 | 7 | $10^{-2}$ | 34 | 32.3 |
| 32 | 7 | $10^{-3}$ | 34 | 34.8 |
| 33 | 7 | $10^{-4}$ | 34 | 46.8 |
| 34 | 5 | $10^{-3}$ | 23 | 36.3 |
| 35 | 5 | $10^{-4}$ | 23 | 46.2 |
| 36 | 5 | $10^{-5}$ | 23 | 57.5 |
| 37 | 5 | $10^{-6}$ | 23 | 66.8 |
| 38 | 6 | $10^{-2}$ | 23 | 31.8 |
| 39 | 6 | $10^{-3}$ | 23 | 34.3 |
| 40 | 6 | $10^{-4}$ | 23 | 38.7 |
| 41 | 6 | $10^{-5}$ | 23 | 53.1 |
| 42 | 6 | $10^{-6}$ | 23 | 65.9 |

Example 43

Polyurethane Monomer Mix

A urethane prepolymer prepared from isophorone diisocyanate, diethylene glycol, polysiloxanediol (molecular wt. 3,000) and endcapped with 2-hydroxyethyl methacrylate was combined with the following; methacryloyloxypropyl tris(trimethylsiloxy)silane (TRIS), N,N-dimethylacrylamide (DMA), N-hexanol, benzoin methyl ether (BME). The proportions are given below.

| Urethane prepolymer | 35 parts |
|---|---|
| TRIS | 35 parts |
| DMA | 30 parts |
| N-hexanol | 40 parts |
| BME | 0.2 parts |

The resulting clear mix was then filtered through a 1.2 micron filter into a clean glass vial.

Example 44

Polyurethane Monomer Mix Containing Surface Active Macromer (SAM)

A monomer mix was prepared as in Example 43 except that 0.25 parts by weight of SAM 80/20 (Example 18) was added.

Example 45

Polyurethane Monomer Mix Containing SAM

A monomer mix was prepared as in Example 43 except that 0.25 parts by weight of SAM 50/50 (Example 20) was added.

Example 46

Polyurethane Monomer Mix Containing SAM

A monomer mix was prepared as in Example 43 except that 0.25 parts by weight of SAM 80/20 5k (Example 23) was added.

Example 47

Polyurethane Monomer Mix Containing SAM

A monomer mix was prepared as in Example 43 except that 0.25 parts by weight of SAM (Example 29) was added.

Example 48

Polyurethane Monomer Mix Containing SAM

A monomer mix was prepared as in Example 30 except that 0.25 parts by weight of SAM (Example 30) was added.

Example 49

Vinyl Carbonate Monomer Mix

A solution was prepared by combining 3[tris(trimethylsiloxy)silyl]propyl vinyl carboxamide (TRISV), 1-vinyl-2-pyrrolidinone (NVP), pentacontamethyl-a,w-bis (4-vinyloxycarbonyloxybutyl)pentacosa siloxane (V2D25, Mw range 2–4k), nonanol, and 2-hydroxy-2-methyl-1-phenylpropan-1-one (DarocurR manufactured by EM Chemical Company. The proportions (by weight) are listed below.

| TRISV | 55 parts |
|---|---|
| NVP | 30 parts |
| V2D25 | 15 parts |
| Nonanol | 10 parts |
| DarocurR | 0.2 parts |

The solution was filtered into a glass vial.

Example 50

Vinyl Carbonate Monomer Mix Containing SAM

A monomer mix was prepared as in Example 49 except that 0.36 parts by weight of SAM 80/20 5k (Example 24) was added.

Example 51

Fluorosilicone Prepolymer Mix

Dimethacrylate-capped polydimethylsiloxane/-polymethyltrifluoropropylsiloxane $M_2D_{35}F_{65}$ as described in U.S. Pat. No. 4,810,764 (fluorosilicone), octafluoropentylmethacrylate (OFPMA), 2-vinyl-4,4-dimethyl-2-oxazalin-5-one (VDMO), and benzoin methyl ether (BME) were combined in the weight proportions shown below.

| Fluorosilicone | 98 parts |
|---|---|
| OFPMA | 2 parts |
| VDMO | 5 parts |
| BME | 0.2 parts |

The resulting solution was filtered. The fluorosilicone monomer employed is described by the formula

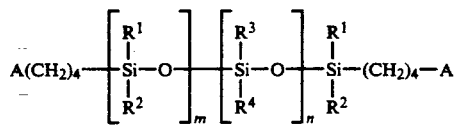

wherein is a methacrylate group; $R_1$, $R_2$ and $R_3$ are methyl groups; $R_4$ is a trifluoropropyl group; m is 36; and n is 65.

Example 52

Fluorosilicone Prepolymer Mix Containing SAM

A monomer mix was prepared as in Example 51 except that 0.25 parts by weight of SAM 80/20 5k (Example 24) was added.

Example 53

Fluorosilicone Prepolymer Mix Containing SAM

A monomer mix was prepared as in Example 51 except that VDMO was replaced with SAM 80/20 5k (Example 24).

Example 54–64

Contact Lens Cast Molding

Anterior and posterior mold surfaces were cleaned by electrostatic deionization in air and transferred to an inert (nitrogen) atmosphere. The mold anterior was then filled with 40–80 uL of monomer mix, (examples 43–53) in the inert atmosphere and placed on a casting plate. The mold posterior was then positioned. Once the casting plate was full the top plate was aligned and tightened down to 18 inch-pounds. Casting plates were then placed under ultraviolet light at 4,000 u watts/cm$^2$, (oxygen level was <50 ppm), for one hour. Following separation the mold halves containing lenses were placed in a 70/30 volume/volume solution of ethanol and water or 100% ethanol. Lenses and solution were placed in an ultrasonic bath at 50° C. and allowed to release. Lenses were then transferred to absolute ethanol. After one hour the solvent was exchanged with fresh ethanol and allowed to stand for 48 hours. Ethanol was then removed by water extraction.

Example 65

Analysis for Surface-Active Macromer at Contact Lens Surface Electron spectroscopy for chemical analysis (ESCA)

Electron spectroscopy for chemical analysis (ESCA) utilizes a monochromatic source of low energy x-ray to produce a core level ionization. The energies of the ejected photons are measured and subtracted from that of the incident photon to obtain their binding energies. These energies identify the elements present at or near the sample surface.

The polyurethane lens of Example 55 was subjected to ESCA analysis at x-ray incident angles of 15, 45, and 90 degrees. The smaller the incident angle, the shallower the probe depth of the sample surface. The atomic percent concentration of fluorine at the different incident angles was 5.33, 3.38 and 3.33%, respectively. These data for the fluorine atom are indicative of a high concentration of surface-active macromer at the lens surface because the concentration of total macromer in the lens sample was only 0.25 weight %.

Example 66

Analysis for Surface-Active Macromer at Contact Lens Surface Contact Angle

The contact angle of the surface of contact lenses prepared in Examples 54, 55, 56, and 58 were measured by the captive bubble technique. The lenses were submerged in buffered saline solution and a bubble of air was attached to the undersurface of the lens. The angle made by the intersection of the lens and bubble surfaces was measured using a goniometer. The lower the contact angle the more hydrophilic or water wettable is the lens surface. Results are shown in Table VI. Note that the lens of Example 54 contained no polymerizable surfactant. Addition of polymerizable surfactant as in Examples 55, 56, and 58 caused a marked reduction in the contact angle.

TABLE VI

| Example No. | Contact Angle |
| --- | --- |
| 54 | 35 |
| 55 | 20 |
| 56 | 14 |
| 58 | 24 |

Example 67

Clinical Evaluation of Example 57

Five subjects wore one contact lens of Example 57 (containing the polymerizable surfactant of Example 23) in one eye and one control contact lens, Example 54 (without polymerizable surfactant) in the other eye. The lenses were analyzed after a minimum of one hour of wear for surface characteristics of wettability and surface deposition. The wettability rating scale was 0–4, where 0 was more than ⅔ of the anterior lens surface unwetted by tear film and 4 represented complete (100%) wetting by tear film. The deposition scale was 0–4 where 0 represented no surface deposits and 4 was multiple deposits of 0.5 mm diameter or larger. The results for the lenses of Example 57 were wettability 3.2 and deposits 1.0 compared to 2.0 and 1.6, respectively, for the control lenses of Example 54.

Example 68

Clinical Evaluation of Example 61

Six subjects wore contact lenses of Example 61 (prepared from the monomer mix of Example 50 and containing the polymerizable surfactant of Example 24) in both eyes for a period of one hour and the lenses were analyzed as in Example 67. The results were wettability 3.2 and deposits 0.1 which compares favorably to values of 2.0 and 1.6, respectively for wettability and deposits for control lenses of Example 54 (which contained no polymerizable surfactant).

Example 69

Clinical Evaluation of Example 56 (1K 50/50 PEOSAM)

Eight subjects wore one contact lens of Example 56 (prepared from the monomer mix of Example 45 and containing the polymerizable surfactant of Example 20) and one control contact lens, Example 54 (without polymerizable surfactant), in the other eye. The lenses were analyzed as in Example 67 after a minimum of one hour of wear for surface characteristics of wettability and surface deposition. The results for the lenses of Example 56 were wettability 2.6 and deposits 1.2 which compares favorably to values of 2.1 and 1.7, respectively, for wettability and deposits for control lenses of Example 54.

Example 70

Clinical Evaluation of Example 58 (80/20 NVPSAM)

Five subjects wore contact lenses of Example 58 (prepared from the monomer mix of Example 47 and containing the polymerizable surfactant of Example 29)

for a period of one hour and the lenses were analyzed as in Example 67. The results were wettability 2.6 and deposits 1.4 which compares favorably to values of 2.0 and 1.6, respectively for wettability and deposits for control lenses of Example 54.

Example 71

Surface Coating of Polyurethane Contact Lenses

A solution of 0.1 mmol surface-active macromer of Example 18, 0.007 g of neopentyl glycol dimethacrylate and 0.0038 g of BME in 100 mL of deoxygenated, distilled water was prepared by stirring at room temperature for one hour. One contact lens, prepared as described in Example 54, was placed in a 10 mL lens vial and the vial was filled with the solution under a nitrogen atmosphere in a glove box. The vial was sealed with a Teflon lined stopper and crimp seal, placed on its side and irradiated with 2500 uW/cm$^2$ of UV light for 2 hours. The lens was removed from the vial, washed with distilled water, extracted in ethanol for 2 hours and boiled in distilled water for 2.5 hours. The lens was then sealed in a vial in buffered saline solution.

Example 72

Surface Coating of Polyurethane Contact Lenses

A solution of 0.1 mmol surface-active macromer of Example 20, 0.01 g of neopentyl glycol dimethacrylate and 0.003 g of BME in 100 mL of deoxygenated, distilled water was prepared by stirring at room temperature for one hour. One contact lens, prepared as described in Example 54, was placed in a 10 mL lens vial and the vial was filled with the solution under a nitrogen atmosphere in a glove box. The vial was sealed with a Teflon lined stopper and crimp seal, placed on its side and irradiated with 2500 uW/cm$^2$ of UV light for 2 hours. The lens was removed from the vial, washed with distilled water, extracted in ethanol for 2 hours and boiled in distilled water for 2.5 hours. The lens was then sealed in a vial in buffered saline solution.

Example 73

Surface Coating of Silicone (SIL-TECH) Contact Lenses

A solution of 0.1 mmol surface-active macromer of Example 18, 0.007 g of neopentyl glycol dimethacrylate and 0.003 g of BME in 100 mL of deoxygenated, distilled water was prepared by stirring at room temperature for one hour. A SIL-TECH silicone elastomer contact lens (available from Bausch & Lomb Incorporated) was placed in a 10 mL lens vial and the vial was filled with the solution under a nitrogen atmosphere in a glove box. The vial was sealed with a Teflon lined stopper and crimp seal, placed on its side and irradiated with 2500 uW/cm$^2$ of UV light for 2 hours. The lens was removed from the vial, washed with distilled water, extracted in 1:1 ethanol:isopropanol for 3 hours. The lens was then sealed in a vial in buffered saline solution.

Example 74

Analysis for Surface-Active Macromer at Contact Lens Surface Contact Angle

The contact angle of the surface coated lenses of Example 73 was measured and compared to an untreated lens (control). The average contact angle of three coated lenses was 38° versus 46° for the control sample.

Example 75

Clinical Evaluation of Example 71

Five subjects wore one contact lens of Example 71 and one control contact lens (the uncoated lens of Example 54, without post treatment) in the other eye. The lenses were analyzed after one hour of wear for surface characteristics of wettability and surface deposition as in Example 67. The results were wettability 2.8 and deposits 1.2 which compares favorably to values of 1.0 and 1.8, respectively for wettability and deposits for control lenses of Example 54.

What is claimed is:

1. A surface active random copolymer described by the formula:

$$C[A_x B_y]$$

wherein A is a monomer unit derived from at least one ethylenically unsaturated hydrophilic monomer selected from the group consisting of ethylenically unsaturated polyalkylenes, polyacrylamides, polyvinylpyrrolidones, polyvinyl alcohols, poly(HEMA), and N-alkyl-N-vinyl acetamide, B is a monomer unit derived from at least one ethylenically unsaturated hydrophilic monomer, C is a functional chain transfer agent, y is within the range from about 0.1 to about 0.9, and $x+y=1$.

2. The copolymer of claim 1 wherein the ethylenically unsaturated hydrophilic monomer, A, is an ethylenically unsaturated polyoxyalkylene selected from the group consisting of (meth)acrylated polyoxyalkylenes, (meth)acrylamido polyoxyalkylenes, styrenyl polyoxyalkylenes, alkenyl polyoxyalkylenes, vinyl carbonate polyoxyalkylenes and vinyl carbamate polyoxyalkylenes.

3. The copolymer of claim 2 wherein the polyoxyalkylene is polyethylene oxide.

4. The copolymer of claim 2 wherein the ethylenically unsaturated hydrophilic monomer, A, is (meth)acrylated polyethylene oxide.

5. The copolymer of claim 1 wherein the ethylenically unsaturated hydrophilic monomer, A, is a methacrylate endcapped poly-N-vinylpyrrolidinone.

6. The copolymer of claim 1 wherein the ethylenically unsaturated hydrophilic monomer, A, is a methacrylate endcapped poly-N,N-dimethylacrylamide.

7. The copolymer of claim 1 wherein the ethylenically unsaturated hydrophobic monomer, B, is selected from the group consisting of alkyl (meth)acrylates, N-alkyl (meth)acrylamides, alkyl vinylcarbonates, alkyl vinylcarbamates, fluoroalkyl (meth)acrylates, N-fluoroalkyl (meth)acrylamides, fluoroalkyl vinylcarbonates, N-fluoroalkyl vinylcarbamates, silicone-containing (meth)acrylates, (meth)acrylamides, vinyl carbonates, vinyl carbamates, styrenic monomers and polyoxypropylene (meth)acrylates.

8. The copolymer of claim 7 wherein the styrenic monomers are selected from the group consisting of styrene, alpha-methyl styrene, para-methyl styrene, para-t-butyl monochloro styrene, and para-t-butyl dichloro styrene.

9. The copolymer of claim 1 wherein the ethylenically unsaturated hydrophobic monomer, B, is 3-methacryloxypropyltris(trimethylsiloxy)silane.

10. The copolymer of claim 1 wherein the ethylenically unsaturated hdyrophobic monomer, B, is 1-H,1-H,5-H-octafluoropentyl methacrylate.

11. The copolymer of claim 1 wherein the functional chain transfer agent, C, is selected from the group consisting of mercapto carboxylic acids, mercapto alcohols, and aminomercaptans.

12. The copolymer of claim 1 wherein the functional chain transfer agent, C, is thioglycolic acid.

13. The copolymer of claim 1 wherein the functional chain transfer agent, C, is mercaptoethanol.

14. The copolymer of claim 1 wherein the functional chain transfer agent, C, is 2-aminoethane thiol.

* * * * *

UNITED STATES PATENT AND TRADEMARK OFFICE
CERTIFICATE OF CORRECTION

PATENT NO. : 5,177,165

DATED : January 5, 1993

INVENTOR(S) : Paul L. Valint, Jr. and Joseph A. McGee

It is certified that error appears in the above-indentified patent and that said Letters Patent is hereby corrected as shown below:

Column 3, line 65, insert --used herein to denote optional-- after "are".

Column 3, lines 66-67, delete "used herein to denote optional".

Column 7, line 67, insert --an alkyl-- after "denotes".

Column 10, line 41, insert --♦-- after "2E".

Column 10, line 44, insert --♦-- before "A" and after "A".

Column 10, line 53, insert --.-- after "D".
Column 12, line 34, insert --radical with 1-- after "alkyl".

Column 12, line 39, delete "'" after both instances of "4".

Column 12, line 67, delete "'" and insert --,-- in its place.

Column 13, line 29, delete "3" and insert --$_3$--.

Column 13, line 29, insert --H,-- after "or".

Column 17, line 61, delete "7" and insert --72--.

UNITED STATES PATENT AND TRADEMARK OFFICE
CERTIFICATE OF CORRECTION

PATENT NO. : 5,177,165
DATED : January 5, 1993
INVENTOR(S) : Paul L. Valint, Jr. and Joseph A. McGee It is certified that error appears in the above-indentified patent and that said Letters Patent is hereby corrected as shown below:

Column 26, line 23, delete "polyalkylenes" and insert
   --polyoxyalkylenes--.

Signed and Sealed this

Twenty-fifth Day of January, 1994

Attest:

BRUCE LEHMAN

*Attesting Officer*   *Commissioner of Patents and Trademarks*